US012793478B1

(12) United States Patent
Bao et al.

(10) Patent No.: US 12,793,478 B1
(45) Date of Patent: Nov. 10, 2026

(54) PROXIMAL REMOTE VEHICLE OPERATIONS

(71) Applicant: Zoox, Inc., Foster City, CA (US)

(72) Inventors: Bo Bao, Fremont, CA (US); Dennis Schaefer, Mission Viejo, CA (US)

(73) Assignee: Zoox, Inc., Foster City, CA (US)

( * ) Notice: Subject to any disclaimer, the term of this patent is extended or adjusted under 35 U.S.C. 154(b) by 298 days.

(21) Appl. No.: 18/168,760

(22) Filed: Feb. 14, 2023

(51) Int. Cl.

| | |
|---|---|
| ***G07C 5/08*** | (2006.01) |
| ***B60Q 1/50*** | (2006.01) |
| ***B60W 50/00*** | (2006.01) |
| ***B60W 60/00*** | (2020.01) |
| ***G05D 1/00*** | (2024.01) |
| ***G05D 1/20*** | (2024.01) |
| ***G05D 1/221*** | (2024.01) |
| ***G07C 5/00*** | (2006.01) |

(52) U.S. Cl.
CPC ........... *G07C 5/0816* (2013.01); *B60Q 1/507* (2022.05); *B60W 60/00* (2020.02); *G05D 1/0016* (2013.01); *G05D 1/20* (2024.01); *G05D 1/221* (2024.01); *G07C 5/006* (2013.01); *G07C 5/008* (2013.01); *B60W 2050/0062* (2013.01)

(58) Field of Classification Search
CPC ...... G07C 5/0816; G07C 5/006; G07C 5/008; B60Q 1/507; B60W 60/00; B60W 60/007; B60W 2050/0062; B60W 60/0025; B60W 60/00186; B60W 60/001; G05D 1/0016
See application file for complete search history.

(56) References Cited

U.S. PATENT DOCUMENTS

| | | | | |
|---|---|---|---|---|
| 6,691,015 | B1 * | 2/2004 | Levine | G08G 1/22 340/905 |
| 10,145,881 | B1 * | 12/2018 | Salter | G05D 1/0212 |
| 11,348,193 | B1 * | 5/2022 | Konrardy | G01S 19/13 |
| 11,643,090 | B2 * | 5/2023 | Willis | B60W 10/18 701/29.2 |
| 2019/0025820 | A1 * | 1/2019 | Ferguson | G08G 1/0112 |
| 2019/0279440 | A1 * | 9/2019 | Ricci | G06Q 10/20 |
| 2019/0279447 | A1 * | 9/2019 | Ricci | B60R 25/01 |
| 2020/0346553 | A1 * | 11/2020 | Grimm | B60L 53/65 |
| 2021/0103288 | A1 * | 4/2021 | Nemedi | G06Q 10/047 |
| 2022/0366736 | A1 * | 11/2022 | Nistler | G07C 5/008 |

FOREIGN PATENT DOCUMENTS

| | | | | |
|---|---|---|---|---|
| JP | 2008033438 A | * | 2/2008 | B60W 30/06 |

* cited by examiner

*Primary Examiner* — Erin M Piateski
*Assistant Examiner* — Hajar Hassaniardekani
(74) *Attorney, Agent, or Firm* — Lee & Hayes, P.C.

(57) ABSTRACT

Systems and techniques for configuring a vehicle based on condition checks are described. A vehicle inspection system may determine a set of checks for a vehicle that may be performed automatically by the inspection system via interaction with a vehicle computing system and/or with operator assistance. The vehicle inspection system may determine vehicle configurations based on the results of the checks and configure the vehicle accordingly. The vehicle may indicate condition and capabilities using a combinations of light and sound emitters.

20 Claims, 5 Drawing Sheets

PROXIMAL REMOTE VEHICLE OPERATIONS

BACKGROUND

A vehicle may be equipped with remote operational capabilities. For example, a vehicle may be configured for remote control by an operator that is not seated in the vehicle. This may allow for the movement and other operations of such a vehicle to be performed by an operator that is in a different location or otherwise outside of the vehicle. In fleet vehicle situations, it may be useful for operators to move vehicles around (e.g., within a storage facility) without requiring that an operator get into a vehicle and manually operate vehicle controls to do so. In fleet vehicle storage facilities and other areas at which remotely controlled vehicles may be operated, there may be operators and other pedestrians present in the vicinity of such remotely controlled vehicles. This may increase the risk of a pedestrian collision with a remotely controlled vehicle. It may be increasingly challenging to efficiently and safely operate vehicles remotely as the number of vehicles and pedestrians in the vicinity increases.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
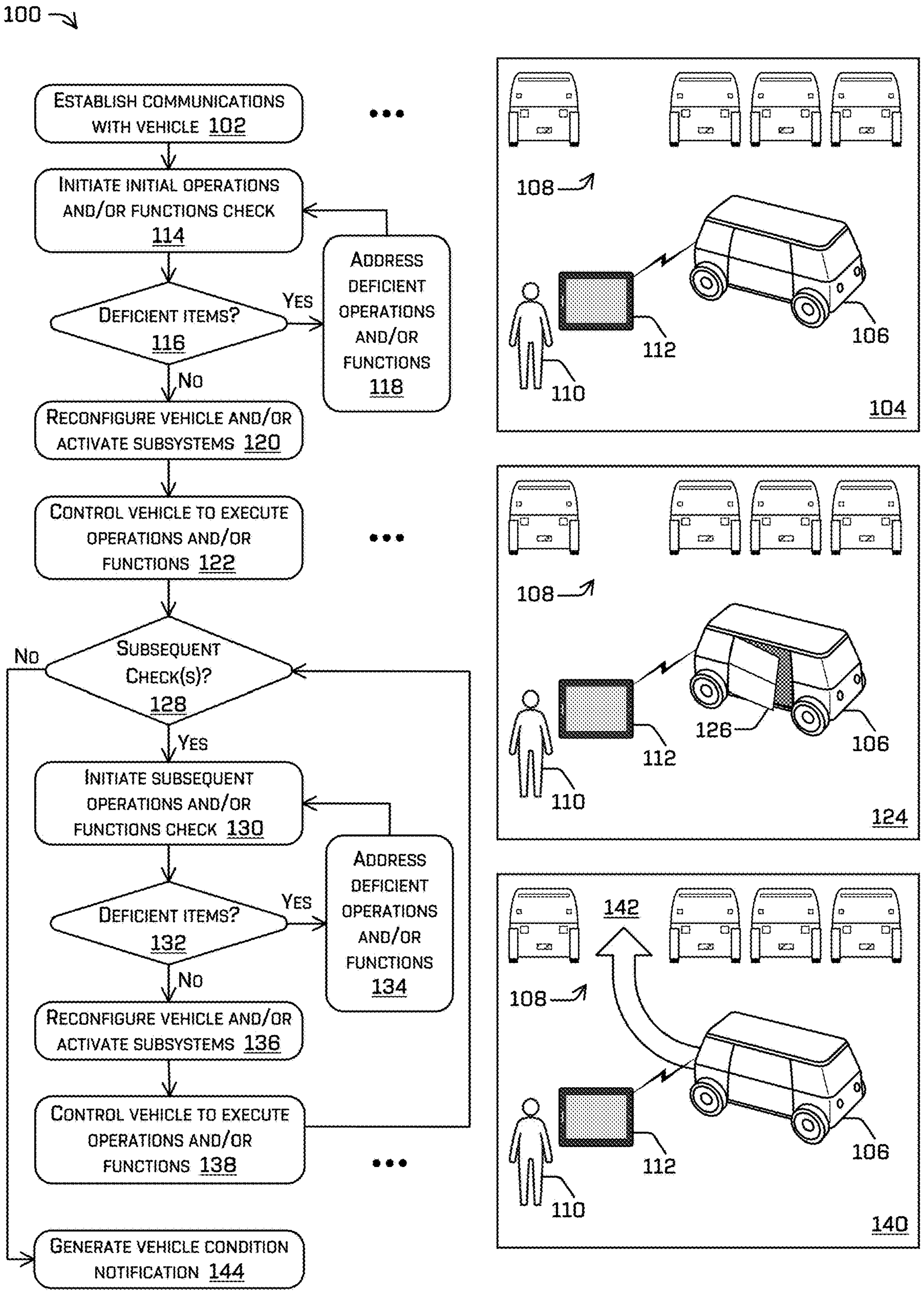
FIG. 1 illustrates an example process for determining vehicle condition data and vehicle configurations, in accordance with examples of the disclosure.

Techniques for configuring a vehicle based on system and/or component checks are discussed herein. Further techniques for indicating a vehicle's status and/or capabilities using various combinations of illumination components configured at a vehicle are discussed herein. Techniques for controlling a vehicle within an enclosed or bounded space in proximity to pedestrians, vehicles, and other objects using the (e.g., limited) functionality available to such a vehicle are also discussed. Additional systems and techniques related to these aspects are discussed in detail herein.

In examples, vehicles operating in a fleet, such as a fleet of autonomous vehicles, may have an associated "home base" or a location where the vehicles may be stored, charged, maintained, repaired, etc. For example, autonomous vehicles providing transportation services may be operated out of a home base where such vehicles may be stored when not in use. While at the home base, the vehicles may be charged and/or refueled and otherwise prepared for service. For example, prior to initiating autonomous service, an autonomous vehicle may be checked for a full charge and/or a fuel load. The vehicle may also, or instead, be checked to ensure that (e.g., all or essential) components are in proper condition and/or properly functioning. For instance, tires may be checked to ensure that the tire pressure is in within a proper operating range and/or sensors may be checked to ensure that they are clean and/or detecting properly. Software installed on various vehicle components may also, or instead, be checked to ensure that it is up to date. The vehicle may also, or instead, be checked for cleanliness (e.g., sufficient interior and/or exterior cleanliness). The vehicle may also, or instead, be checked to ensure that proper signage, warnings, guides, etc. are present and clearly visible to vehicle passengers. Any of the systems, components, and/or other aspects of a vehicle of any type may be checked by a fleet operator prior to putting a vehicle into service. Similar and/or other checks may be performed when a vehicle returns to a home base from active service.

In examples, one or more of the checks performed on a vehicle may be automated tests that may be performed by vehicle components to generate results that may be provided to an operator (e.g., to a computing device operated by a human operator and/or by an automated or computing system associated with the operator). For example, a vehicle computing system may determine its own operating software version, whether communications between various components configured at the vehicle are operable (e.g., communications between a computing system and one or more sensors), whether components are properly powered, etc. Mechanical systems at a vehicle may also be capable of automated checks. For example, a vehicle computing system may be configured to detect data from one or more tire pressure sensors, oil level sensors, fuel level sensors, etc. to determine mechanical and/or physical conditions of various vehicle components. Various other systems and/or components of a vehicle may be configured to perform self-checks.

Other checks that may be performed on a vehicle may be manual checks that may be performed by a human operator. For example, the cleanliness of the interior and/or exterior of a vehicle may be checked by a human operator. The presence and visibility of safety and/or commercial signage and other physical communications means may be checked by a human operator. Damage to the interior and/or exterior of a vehicle may be checked for and assessed by a human operator (e.g., upon return of the vehicle to the home base or before beginning operational service). Alternatively or additionally, damage, cleanliness, and other visually detectable conditions of a vehicle interior or exterior may be assessed using machine vision, cameras, and/or other types of sensors and sensor systems. Various other systems and/or components of a vehicle may be manually checked by a human operator.

In order to ensure safe and efficient vehicle operation, one or more predetermined sets of checks may be performed on a vehicle at one or more points between vehicle active service. For example, upon initial arrival of a vehicle at home base following active service, a particular set of checks may be performed to assess damage, determine operating conditions, whether repairs are needed, etc. Similarly, immediately prior to embarking into active service from home base, another particular set of checks may be performed to ensure the vehicle is in condition for active service, such as checking for current software, ensuring that the vehicle has a full charge and/or fuel tank, ensuring physical and/or mechanical systems are in proper conditions (e.g., proper tire pressure, visible signage, cleanliness, etc.).

In examples, as described in more detail herein, there may be multiple sets of checks performed on a vehicle at various stages or vehicle states while a vehicle is at a home base. In some examples, one or more sets of checks may also be performed during vehicle active service, for example, in response to detecting an error condition and/or the generation of a notification or alert by the vehicle (e.g., by the vehicle computing system).

A vehicle may be configured based on a set of checks that may be performed on a vehicle and/or on a vehicle state before or after one or more sets of checks have been performed. For example, upon entering a home base, an autonomous vehicle may be configured to park at a receiving area, lock all the doors, and power down some or all of its components. The vehicle may remain in this state until an operator has confirmed that the results of a particular set of checks are satisfactory. In response to the results of the particular set of checks being satisfactory, the vehicle may then be reconfigured and/or modified (e.g., automatically). For example, the vehicle doors may be activated (e.g., unlocked and/or opened) and a subset of the vehicle components may be powered on. Vehicle capabilities may also, or instead, be enabled and/or disabled based on a set of checks. For example, after the vehicle has satisfactorily passed an initial set of checks, the drive components of the vehicle may be enabled, but the drive capabilities of the vehicle may be limited to manual control (e.g., remote control) and to movement under a particular speed. This may allow the vehicle to be moved to another location for further testing and/or maintenance operations while ensuring safe operation of the vehicle.

For example, after an initial set of checks and entering a first capability state, the vehicle may be manually controlled by an operator to move to a subsequent checking area. At this subsequent checking area, a subsequent set of checks may be performed. To perform this subsequent set of checks, the operator may initiate one or more self-checks of vehicle components and/or perform one or more manual checks. For example, the charge state, fuel load, software version(s), component condition(s), etc. of the vehicle and/or various vehicle components may be checked by a vehicle computing system and reported to an operator (e.g., to an operator device). The operator may also, or instead, perform one or more manual checks, such as inspecting the vehicle for damage, checking vehicle cleanliness, etc.

The results of a check or a set of checks as described herein may be stored (e.g., at a remote system or server) for future use. The results may be stored with a timestamp indicating a time at which the results were determined and/or the corresponding check or set of checks were completed. In various examples, particular results may trigger particular actions. For example, a failure of a non-critical check or a check associated with a non-critical component (e.g., the exterior or interior fails a cleanliness check) may result in a results presentation to the operator. Alternatively, a failure of a critical check or a check associated with a critical component (e.g., a drive component or safety component fails a check) may result in a notification (e.g., page, email, alert, text, etc.) to upper-level operators, management, etc.

After determining the results of these checks, the vehicle state may be altered based on such results. For example, if there are one or more malfunctioning components or damages to the vehicle, the vehicle may be placed in a "repair" state, reconfigured, or otherwise modified for repair purposes. This may include configuring vehicle components to enable the vehicle to be moved to a repair area (e.g., adjusting drive capabilities to enable this movement) where repairs may be performed on the vehicle (e.g., replace parts, repair components, etc.). If there are no malfunctioning components or disabling damages to the vehicle, the vehicle may be placed in a "maintenance" state, reconfigured, or otherwise modified for maintenance purposes. This may include configuring vehicle components to enable the vehicle to be moved to a maintenance area (e.g., adjusting drive capabilities to enable this movement) where maintenance functions may be performed on the vehicle (e.g., connect to a charger, fill a fuel tank, update software, etc.). The vehicle may be subject to one or more additional subsequent sets of checks and/or one or more additional reconfigurations of the vehicle and/or vehicle state.

After one or more subsequent sets of checks and corresponding reconfigurations of the vehicle and/or vehicle state have been performed, the vehicle may be stored (parked) to await a next operational service period. Ongoing maintenance operations, such as charging, may be performed while the vehicle is awaiting its next operational service period.

A final set of checks may be performed on a vehicle prior to the vehicle entering operational service. This final set of checks may be initiated by an operator and may include one or more self-checks of vehicle components and/or one or more manual checks. For example, the charge state, fuel load, software version(s), component condition(s), etc. of the vehicle and/or various vehicle components may be verified by a vehicle computing system and reported to an operator (e.g., to an operator device) to ensure that the state of the vehicle is current and that previously performed maintenance was completed. The operator may also, or instead, perform one or more manual checks, such as inspecting the vehicle for damage, checking vehicle cleanliness, etc., to ensure that no damage or soiling of the vehicle has occurred since it was last checked. Various autonomous operation components of the vehicle may be checked. For example, sensors may be tested for proper operation and checked for cleanliness. Autonomous components may be tested for operational and communications capabilities. Remote teleoperator communications may be tested to ensure that the vehicle can be remotely operated if needed.

After determining the results of these final checks, the vehicle state may be altered based on such results. For example, if there are one or more malfunctioning components or damages to the vehicle, the vehicle may be placed in a "repair" state or otherwise reconfigured for repair purposes. This may include configuring vehicle components to enable the vehicle to be moved to a repair area (e.g., adjusting drive capabilities to enable this movement) where repairs may be performed on the vehicle (e.g., replace parts, repair components, etc.). If there are no malfunctioning components or disabling damages to the vehicle, the vehicle may be placed in an "operational" state or otherwise reconfigured for operational service. This may include activating the autonomous operation components of the vehicle to allow the vehicle to autonomously operate and enabling remote control capabilities of the vehicle for teleoperators (e.g., rather than local operators proximate to the vehicle in the home base). The vehicle may then begin autonomous operation.

An operator may use a vehicle inspection system to exchange data with a vehicle and to control a vehicle while a vehicle is at a home base. This vehicle inspection system may include one or more checks that may be performed for a vehicle as part of a particular set of checks. To perform such checks, the vehicle inspection system may exchange data with the vehicle (e.g., with a vehicle computing system and/or one or more other computing components configured at the vehicle). For example, the vehicle inspection system may query a vehicle computing system for various statuses and other data (e.g., tire pressure, battery charge, amount of fuel, software version, sensor status, etc.). Additionally or alternatively, the vehicle inspection system may receive input from the operator, for example, regarding manual checks. For example, the vehicle inspection system may present a graphical user interface (GUI) to the operator allowing the operator to provide input regarding damage, missing or obscured signage or other physical communications means, cleanliness, etc.

Based on the results of a set of checks, the vehicle inspection system may reconfigure a vehicle and/or later a vehicle's state. Alternately or additionally, a vehicle computing system may receive an indication of results of a check or a set of checks and may be configured to responsively reconfigure the vehicle based on such results. For example, in response to passing an initial set of checks, the vehicle inspection system may interact with the vehicle computing system to unlock the doors of the vehicle and enable limited drive capabilities to allow the vehicle to be further inspected and/or moved to a subsequent inspection area or parking area. Alternatively, in response to failing an initial set of checks, the vehicle inspection system may interact with the vehicle computing system to configure the vehicle for repairs and/or to allow the vehicle to be moved to a vehicle repair area.

In another example, in response to passing a final set of checks, the vehicle inspection system may interact with the vehicle computing system to fully enable the autonomous components of a vehicle, fully enable drive capabilities, and enable communications with one or more teleoperators to allow the commencement of autonomous operations. Alternatively, in response to failing a final set of checks, the vehicle inspection system may interact with the vehicle computing system to configure the vehicle for return to a repair area (e.g., if previously undiscovered damage or component malfunction is detected) or maintenance area (e.g., if a battery is not sufficiently charged or a fuel tank is not sufficiently filled). Any other set of checks and corresponding configurations and/or reconfigurations of a vehicle (e.g., via interaction between a vehicle computing system and a vehicle inspection system) are contemplated.

A vehicle inspection system interacting with a vehicle computing system may also perform the operation of authorizing an operator to access and remotely control a vehicle. For example, the vehicle computing system may detect that an operator is proximate to the vehicle based on one or more signals emitted by a computing device operated by the operator and executing the vehicle inspection system. For instance, the vehicle inspection system may cause the operator's computing device to emit a near-field communications (NFC) signal, wireless signals using protocols such as 802.11x, line-of-sight, and/or a short-range wireless signal (e.g., Bluetooth) that may be detected by the vehicle computing system. Alternatively or additionally, the vehicle computing system may detect that an operator is proximate to the vehicle based on sensor data and/or data generated by a perception component configured at the vehicle. For example, the vehicle computing system may use sensor data combined with a determination that the vehicle is at a home base to determine that a detected pedestrian close to the vehicle may be an operator. In response, the vehicle computing system may activate a short-range or NFC component to allow for an interaction with a device of the operator. The vehicle computing system and the vehicle inspection system may exchange communications to authenticate the operator of the operator computing device. Once authenticated, the vehicle computing system (in some examples via interaction with the vehicle inspection system) may authorize the operator for remote control of the vehicle.

Communication between a vehicle computing system and a vehicle inspection system may move to alternate communications means once authentication and/or authorization of an operator has been established. For example, the vehicle computing system and the vehicle inspection system may communicate using Wi-Fi or other wireless communications means after using short-range or NFC communications means to initially authenticate an operator. That is, the initial short-range or NFC communications means may be used to determine that the operator is physically proximate to the vehicle and authorized to access and/or control the vehicle, and then a more robust means of communications may be implemented to perform further operations (e.g., execute one or more sets of checks on the vehicle). Alternatively, the vehicle computing system and the vehicle inspection system may communicate using short-range or NFC communications means to perform any or all operations described herein.

The vehicle inspection system may include a vehicle control component. Alternatively or additionally, a computing device operated by an operator may be configured with a vehicle remote control application. This application or component may allow the operator to remotely control the vehicle from outside the vehicle while the vehicle is at the home base. Examples of techniques for remotely controlling a vehicle can be found, for example, in U.S. Pat. No. 11,442,460, issued Sep. 13, 2022, and titled "External Control of an Autonomous Vehicle," the contents of which are herein incorporated by reference in its entirety and for all purposes.

A vehicle may be configured with one or more external visual and/or audible indicators that may be used to provide data and/or check results to an operator. Alternately or additionally, such indicators may be configured to provide vehicle state, status, and/or capability information (to anyone that is within sight or sound range of the vehicle). In examples, one or more of such indicators may be a light source. Such light sources may be one color (e.g., red, yellow, orange, etc.) or may be capable of emitting multiple colors (e.g., all visible colors). Such light sources may further be capable of turning on or off as instructed (e.g., to blink rapidly). Similarly, in examples, one or more of such indicators may be an acoustic source configured to emit sounds. Such acoustic sources may be configured to emit one frequency or multiple frequencies of sound waves. Such acoustic sources may be configured to vary the frequencies emitted based on instructions or may emit a static frequency or combination of frequencies. Such acoustic sources may further be capable of turning on or off as instructed (e.g., rapidly to "beep"). Such indicators may provide information to an operator without the need to electronically (whether over a wired or wireless communication) probe the vehicle for diagnostics.

A vehicle computing system may be configured to activate such indicators to externally indicate to operators and other people in the vicinity of the vehicle a vehicle state, status, condition, etc. For example, when the vehicle is moving under remote control, the vehicle computing system may be configured to beep and flash red lights to inform those in the vicinity to be aware of the moving vehicle. The vehicle computing system may also, or instead, be configured to activate one or more lights of particular color(s) to indicate a charging status, an autonomous and/or manual operation status, a software updating status, etc. Any combinations of light and/or sound indications may be used to indicate any vehicle states, statuses, conditions, etc., including those described herein.

The systems and techniques described herein may be directed to leveraging vehicle computing system data and vehicle inspection data to enable a vehicle inspection system to more accurately and efficiently determine vehicle and vehicle component condition, status, and other vehicle state data. The vehicle inspection system may in turn use such data to modify the configuration of a vehicle, adjust a vehicle state, and/or modify vehicle capabilities, including while the vehicle may be remotely controlled within a home base environment. In particular examples, the systems and techniques described herein can utilize data structures containing data representing vehicle component status, state, and/or condition. By using the vehicle inspection and configuration techniques described herein to more accurately determine vehicle component conditions and vehicle status and responsively reconfigure a vehicle, the examples described herein may result in increased safety and efficiency of vehicle operation and control. By configuring vehicle capabilities based on more accurate determinations of vehicle condition and status, the techniques described herein allow an autonomous vehicle to be more safely operated and maintained at a home base, thereby improving the safety and passenger comfort provided by the vehicle when it is in active operation in an environment.

For example, the techniques described herein may be faster and/or more robust than conventional techniques, as they may increase the ability of a vehicle inspection system to accurately and efficiently determine vehicle condition and configure a vehicle accordingly. The techniques described herein may also facilitate the use of configurable vehicle drive capabilities, which in turn may increase the maneuverability of a vehicle within a confined location, such as a home base. Such increased maneuverability may increase the ability of operators to safely navigate the vehicle to maneuver around obstacles and move the vehicle to various areas in the home base. Vehicle condition-based reconfigurability may also increase vehicle security by limiting the capabilities of a vehicle when it is under manual remote control. The disclosed techniques further increase safety of operation of the vehicle by providing for visible and audible indications of vehicle state, status, and/or capabilities. The ability to implement more accurate checks on a vehicle and its components and to more clearly receive indications of the results of such checks may also increase the safety of vehicle operations by increasing the accurate detection of potentially unsafe conditions or malfunctions.

The techniques described herein may also enable improved vehicle inspections and more efficient and safe operation of a vehicle by configuring the vehicle with appropriate capabilities for its current inspection state. That is, techniques described herein provide a technological improvement over existing vehicle inspection and configuration techniques and vehicle control technology. The techniques described herein may also improve the operation of computing systems and increase resource utilization efficiency. For example, computing systems, such as vehicle computing systems and operator computing systems executing vehicle inspection systems, may more efficiently perform vehicle condition determinations using the techniques described herein because the disclosed examples may reduce the amount of data needed to represent a vehicle condition and therefore the processing required to determine a vehicle configuration based on the vehicle condition.

The systems and techniques described herein can be implemented in a number of ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein can be applied to semi-autonomous and/or manually operated vehicle. In another example, the techniques can be utilized in an aviation or nautical context, or in any system involving vehicle or object trajectories and/or collision avoidance operations. Further, although discussed in the context of originating with particular types of sensor data and processing with particular types of components, data and data structures as described herein can include any two-dimensional, three-dimensional, or multi-dimensional data and data associated with any other types of sensors (e.g., cameras, lidar, radar, sonar, time-of-flight, and the like). Additionally, the techniques described herein can be used with real data (e.g., captured using sensor(s)), simulated data (e.g., generated by a simulator, training data, and the like) or any combination of the two.

Figure 5:
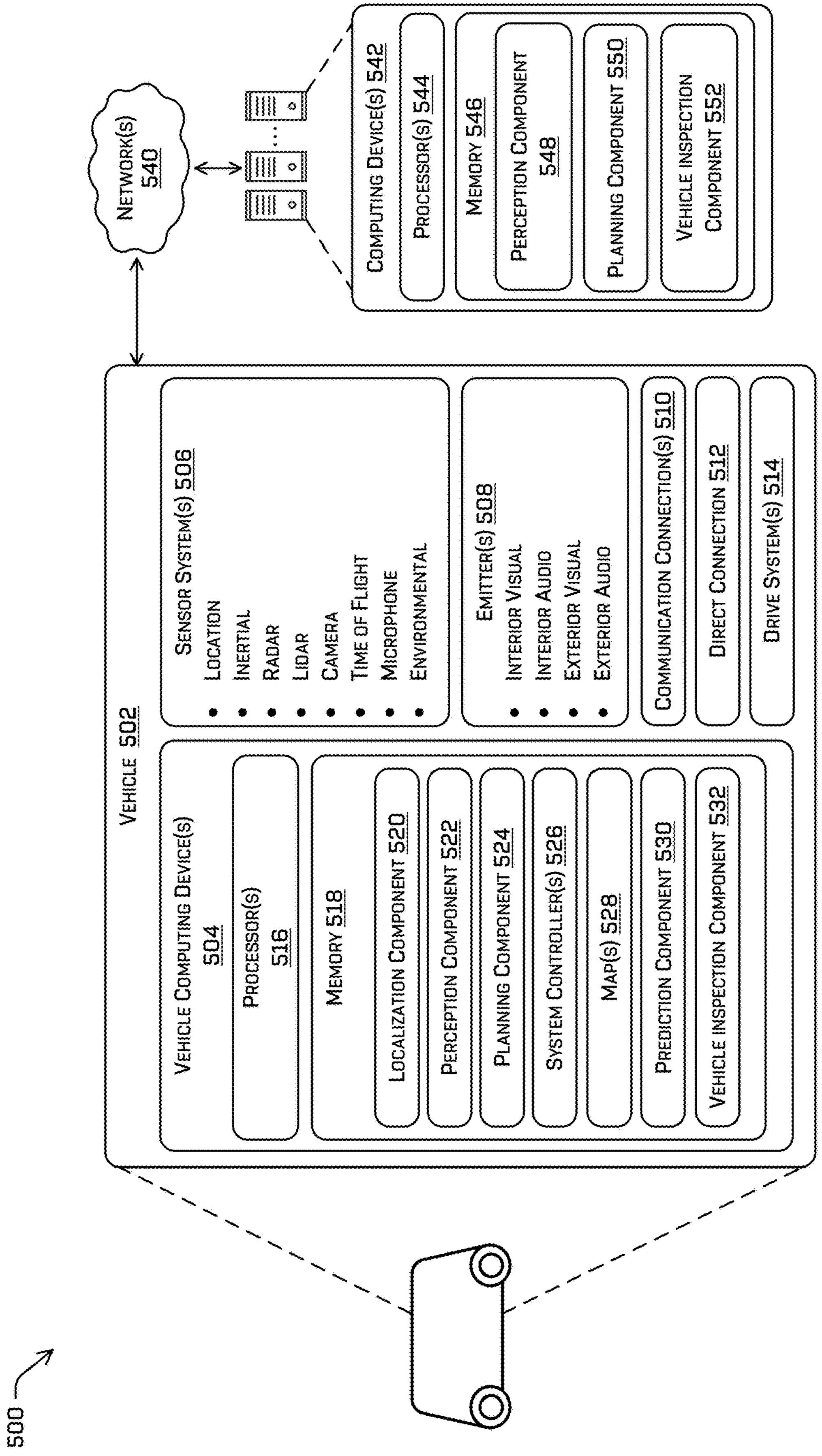
FIG. 5 depicts a block diagram of an example system for implementing the techniques described herein.

FIG. 1 is a pictorial flow diagram of an example process 100 for determining vehicle condition data and vehicle configurations based on vehicle state data and/or operator input. In examples, one or more operations of the process 100 may be implemented by a vehicle inspection system or other computing system external to a vehicle and/or a vehicle computing system, such as by using one or more of the components and systems illustrated in FIG. 5 and described below. For example, such one or more components and systems can include those associated with the computing device 542, such as the vehicle inspection component 552, and/or the vehicle computing device 504, such as vehicle inspection component 532, illustrated in FIG. 5. In examples, the one or more operations of the process 100 may be performed by a combination of a remote system and a vehicle computing system. However, the process 100 is not limited to being performed by such components and systems, and the components and systems of FIG. 5 are not limited to performing the process 100.

At operation 102, a computing device executing an application, such as a fleet operator's vehicle inspection system, may establish communications with a vehicle computing system (e.g., a computing system configured at an autonomous vehicle). In various examples, such as when a vehicle returns to a home base after a period of operational service, a vehicle computing system may enter a condition or state of high security and/or limited access and mobility. For example, the vehicle computing system may autonomously control the vehicle to the home base at a scheduled time and/or based on one or more conditions (e.g., low battery charge, component malfunction, return instruction received, etc.). Once at the home base, the vehicle computing system may be configured to enter a lockdown mode or other high security, low mobility state.

For example, to ensure that access to the vehicle is limited to authorized personnel and/or that the vehicle is not moved or controlled except as intended by authorized personnel, the vehicle computing system may lock all the doors, power down the drive components, apply a parking brake or other mechanical brake to wheels, and/or otherwise enter a "hibernation" state where only wireless and/or wired communications capabilities remain operative. The vehicle computing system may remain in this state until it detects a signal proximate to the vehicle. For example, the vehicle computing system may configure short-range and/or NFC components to remain active to detect a signal from a physically proximate device. Once detected, the vehicle computing system may interact with that device to authenticate and/or authorize a user of that device. If the user fails to authenticate and/or is otherwise not an authorized user, the vehicle may remain in a lockdown state. If the user is an authorized user, the vehicle computing system may establish a communications session with the user's device, for example, using the short-range communications means or using Wi-Fi or another longer range communications means. After this communications session is established, the vehicle computing system may still remain in a lockdown or hibernation state until instructed otherwise by the authorized user via the user's computing device.

An example 104 illustrates an example vehicle 106 located at a home base and in a lockdown or hibernation state. There may be several other vehicles 108 at the home base. An operator 110 may also be at the home base operating an operator device 112. The operator device 112 may establish communications with the vehicle 106 when the operator device 112 is within a short range of, or otherwise proximate to, the vehicle 106. For example, the operator device 112 may be a component of, or configured with, a vehicle inspection system that may be configured to interact with the vehicle computing device of the vehicle 106 using short-range communications.

At operation 114, an initial set of checks may be performed, for example, using the vehicle inspection system. For example, the vehicle inspection system may interact with the vehicle computing system to instruct the vehicle computing system to perform and/or direct one or more vehicle components to perform one or more self-checks. The vehicle computing system may execute these self-checks and transmit the results of such checks to the vehicle inspection system. Examples of such self-checks or otherwise automated checks that may be performed include checking a battery level, checking tire pressure (e.g., using tire pressure sensors), checking various fluid levels (e.g., using corresponding fluid sensors), checking a software version, checking inter-component communications (e.g., can the vehicle computing system communicate with sensors, drive components, etc.), checking computing components status (e.g., memory or data storage capacity and availability), checking that the vehicle is stationary (e.g., based on vehicle sensors), etc.

The vehicle inspection system may also, or instead, interact with the operator to obtain results data for one or more manual checks. For example, the vehicle inspection system may present instructions (e.g., on a GUI generated and presented on a display of the operator device) instructing the operator to perform one or more manual vehicle checking operations. Examples of such manual checks that may be performed by a human operator include visual inspections for vehicle damage, interior cleanliness, exterior cleanliness, tire condition, brakes condition, suspension component condition, ride height, condition of signage and/or other physical communication means, condition and/or operation of physical components (e.g., doors, steps, compartments, seats, etc.), audible inspection for unusual sounds or noises, confirmation that the vehicle is stationary, etc. The vehicle inspection system may further present one or more manual checking inputs (e.g., on a GUI generated and presented on the display of the operator device) soliciting input from the operator regarding the results of the manual checks. These results input may be one or more checkboxes, buttons, etc. allowing for the selection of discrete values (e.g., "yes," "no," "poor," "fair," "good," etc.). Results inputs may also, or instead, include freeform inputs, such as text boxes into which the operator may enter text, audio inputs for audio data (e.g., voice), image inputs for image data (e.g., captured with a camera on the operator device), video inputs for video data (e.g., captured with a camera on the operator device), etc.

At operation 116, based on the inputs received from the vehicle computing system and/or manually input by the operator, the vehicle inspection system may determine whether there are items in the initial set of checks that are deficient. If there are deficient items, at operation 118 those items may be addressed, for example, before reconfiguring the vehicle based on satisfying the initial set of checks. As part of addressing one or more deficient items, the vehicle may be reconfigured. For example, drive components of the vehicle may be enabled to allow the vehicle to be moved to an area where such items may be addressed.

For example, the initial set of checks may include a manual check for vehicle cleanliness. If, at operation 116, the operator provides input to vehicle inspection system indicating that the vehicle is not clean, at operation 118 the vehicle may be configured for motion and moved (e.g., by an operator using remote control) to a cleaning area. The initial set of checks may also, or instead, include an automated check performed by the vehicle computing system of tire pressure by obtaining data from one or more tire pressure sensors. If the vehicle computing system determines, at operation 116, that tire pressure is outside of an acceptable range of pressures, or if the vehicle computing system reports a tire pressure that the vehicle inspection system determines is outside of an acceptable range of pressures, at operation 118 the operator may be instructed to fill one or more of the tires and/or vehicle may be configured for motion and moved (e.g., by an operator using remote control) to an area with an air supply to allow one or more of the tires to be filled. The initial set of checks may also, or instead, include an automated check performed by the vehicle computing system to determine the current software version for software configured at one or more components of the vehicle and/or for itself. If the vehicle computing system determines, at operation 116, that one or more pieces of software require updating, at operation 118 the operator may be instructed to update the software or move (e.g., by the operator using remote control) the vehicle to an area where the software can be updated. Alternatively, the vehicle computing system may be configured or instructed to update software and/or autonomously control the vehicle to an area where software may be updated. Any other checks may be performed and the corresponding results evaluated at operation 116. One or more deficiencies of any type may be addressed at operation 118. During such operation, control may be limited (e.g., maximum velocities, steering angles, etc.) may be set.

If, at operation 116, the vehicle inspection system determines that (e.g., all) items in the initial set of checks are satisfied, at operation 120 the vehicle may be reconfigured based on passing the initial set of checks. For example, the vehicle inspection system may transmit a signal to the vehicle computing system that causes one or more components of the vehicle to be reconfigured or otherwise modified. For instance, the vehicle inspection system may transmit one or more instructions to the vehicle computing system to enable and/or reconfigure one or more components of the vehicle. Alternatively or additionally, the vehicle computing system or a vehicle inspection component configured at the vehicle may enable and/or reconfigure one or more components of the vehicle based on a vehicle condition and/or check results. For instance, the vehicle inspection system may transmit results of a check or a set of checks or an indication of a vehicle condition to the vehicle computing system or vehicle inspection component configured at the vehicle. The vehicle computing system or vehicle inspection component configured at the vehicle may be configured to reconfigure or modify one or more components of the vehicle based on the received results and/or condition. The vehicle computing system or vehicle inspection component configured at the vehicle may also use other data as a basis for such reconfigurations or modifications, such as a current vehicle location (e.g., at a landing area, at a lunch area, at a charging station, etc.).

For example, drive components of the vehicle may be enabled and/or configured in a specific manner based on the results of a check or set of checks or a condition. For instance, the drive components may be enabled and configured for low speed travel (e.g., limited to motion at or below a threshold maximum velocity and/or acceleration). The vehicle and/or vehicle computing system may also, or instead, be configured for short distance travel (e.g., limited to a configured number of meters (e.g., 100 meters, 500 meters, 1000 meters)). Examples of other aspects of the vehicle that may be enabled or reconfigured may include door locks, compartment locks, sensors, emitters, etc. Any aspect of a vehicle that may enable it to be further inspected and/or operated at a home base may be enabled and/or configured based on satisfying an initial set of checks.

At operation 122, in examples using the enabled and/or reconfigured vehicle components, systems, and/or subsystems, the vehicle may be controlled to perform one or more operations or functions. For example, with the drive systems enabled and configured for low speed travel and/or with the vehicle configured for a limited distance of travel, the operator may remotely control the vehicle to another area in the home base (e.g., for subsequent checks, maintenance, repairs, etc.). Alternatively or additionally, with a current version of the vehicle computing system software verified in the initial set of checks, the vehicle computing system may be instructed to power up other vehicle components (e.g., sensors, planning components, perception components, emitters, drive systems, communications systems, etc.) in preparation for further checks and/or service. Alternatively or additionally, with brakes verified and the vehicle confirmed to be stationary in the initial set of checks (e.g., to ensure operator safety when approaching the vehicle), doors may be unlocked and/or opened, steps may be lowered, etc.

An example 124 illustrates the example vehicle 106 located at a home base following satisfaction of an initial set of checks determined by a vehicle inspection system that may be configured at the operator device 112 operated by operator 110. As the vehicle 106 has passed the initial set of checks, the vehicle inspection system may reconfigure the vehicle 106, for example, by unlocking and/or opening a door 126 of the vehicle. This may allow the operator 110 the ability to perform a manual inspection of the interior of the vehicle 106 after a confirmation, via the initial set of checks, that the vehicle 106 is stationary, the brakes are applied to keep it in place, and/or that the vehicle is otherwise safe to approach. For example, confirming via a check that the brakes are applied may help ensure that the vehicle 106 remains safely stationary while the operator 110 is inspecting the interior.

At operation 128, the vehicle inspection system may determine whether there are any additional checks to be performed on the vehicle. For example, the initial set of checks performed at operation 114 may be the first of multiple checks that may be performed on a vehicle between the time it arrives at a home base and the time at which it is returned to active service. For instance, a vehicle may be checked upon return from active service for any damage and/or other conditions incurred during service and checked at least once more before returning to active service to ensure the vehicle is in good operating condition for active service. Any number of intermediate checks may be performed between these example checkpoints. For example, a set of checks evaluated (e.g., immediately) upon return from active service may be relatively brief and intended to ensure that the vehicle can be moved safely to another area for a more detailed subsequent set of checks. Alternatively, the initial set of checks performed at operation 114 may be performed when the vehicle arrives at home base and, upon passing this set of checks, the vehicle may be parked or otherwise stored for any future activity. If, at operation 128, there are no further checks to be performed, at operation 144 a notification of the results of the initial set of checks and/or any other checks may be generated and provided to an operator. Any other vehicle maintenance and/or other operations may also be performed and/or the vehicle may be parked or stored for future activities at operation 144.

If there are other checks to be performed, these checks may be initiated at operation 130. This may include remotely controlling the vehicle to move to a different area within the home base to perform these checks. The vehicle inspection system may initiate any number and type of checks as part of a subsequent set of checks performed on a vehicle at operation 130, including those described herein. The vehicle inspection system may interact with a vehicle computing system of the vehicle and/or a vehicle inspection component configured at the vehicle to perform one or more of these checks (e.g., automated checks). The vehicle inspection system may also, or instead, interact with the operator as described herein to perform one or more of these checks (e.g., manual checks). For example, the vehicle may be moved to a charging area following the completion of an initial set of checks and connected to a charger. The subsequent set of checks may include checks on the charging system to determine whether the vehicle is receiving and accepting charge properly. Where the vehicle was initially checked for exterior damage and proper mechanical operation in the previous set of checks, the subsequent set of checks may include checking for cleanliness, visibility of signage, etc. Of course, the particular checks performed on a vehicle and the sequence and grouping of such checks are variable and may be determined based on operator requirements. All such examples are contemplated as within the scope of this disclosure.

In examples, the subsequent set of checks may be based on an initial or previous set of checks. For example, if a previous check indicated that a tire was low and the tire was filled to within an acceptable pressure range during the previous set of checks, the tire pressure may again be checked in a subsequent set of checks to determine if the tire has a relatively fast leak. However, if there was no indication of low tire pressure detected in a previous set of checks, tire pressure may not be checked again in a subsequent set of checks. Alternatively, safety critical issues such as tire pressure may be checked at several or all sets of checks to ensure that the vehicle is in a safe operating condition.

At operation 132, based on the inputs received from the vehicle computing system and/or manually input by the operator, the vehicle inspection system may determine whether there are items in the subsequent set of checks that are deficient. If there are deficient items, at operation 134 those items may be addressed, for example, before reconfiguring the vehicle based on satisfying the subsequent set of checks. As part of addressing one or more deficient items, the vehicle may be reconfigured. For example, drive components of the vehicle may be enabled to allow the vehicle to be moved to an area where such items may be addressed.

If, at operation 132, the vehicle inspection system determines that (e.g., all) items in the subsequent set of checks are satisfied, at operation 136 the vehicle may be reconfigured based on passing the subsequent set of checks. For example, the vehicle inspection system may transmit a signal that causes the vehicle computing system to enable and/or reconfigure one or more components of the vehicle. For instance, the vehicle inspection system may transmit one or more instructions to the vehicle computing system to enable and/or reconfigure one or more components of the vehicle. Alternatively or additionally, the vehicle computing system or a vehicle inspection component configured at the vehicle may be configured to enable and/or reconfigure one or more components of the vehicle based on check results or one or more conditions. For instance, the vehicle inspection system may transmit results of a check or a set of checks or an indication of a vehicle condition to the vehicle computing system or vehicle inspection component configured at the vehicle. In examples, the signal may indicate to the vehicle computing system that a previously indicated condition (e.g., indicated at operation 120) has been remediated. The vehicle computing system or vehicle inspection component configured at the vehicle may be configured to reconfigure or modify one or more components of the vehicle based on the received results and/or condition.

For example, drive components of the vehicle may be enabled and/or configured in a specific manner based on the check results and/or condition. For instance, the drive components may be enabled and configured for a low speed travel (e.g., limited to motion at or below a threshold maximum velocity and/or acceleration). The vehicle and/or vehicle computing system may also, or instead, be configured for short distance travel (e.g., limited to a configured number of meters (e.g., 100 meters, 500 meters, 1000 meters)). Examples of other aspects of the vehicle that may be enabled or reconfigured may include door locks, compartment locks, sensors, emitters, etc. Any aspect of a vehicle that may enable to be further inspected and/or operated at a home base may be enabled and/or configured based on satisfying a subsequent set of checks.

At operation 138, in examples using the enabled and/or reconfigured vehicle components, systems, and/or subsystems, the vehicle may be controlled to perform one or more operations or functions. For example, with the drive systems enabled and configured for low speed travel and/or with the vehicle configured for limited distance travel, the operator may remotely control the vehicle to another area in the home base (e.g., for another subsequent check, charging, maintenance, repairs, etc.). Alternatively or additionally, with a current version of the vehicle computing system software verified in the subsequent set of checks, the vehicle computing system may be instructed to power up other vehicle components (e.g., sensors, planning components, perception components, emitters, drive systems, communications systems, etc.) in preparation for further checks and/or service. Alternatively or additionally, with the vehicle computing system verifying that communication between it and other components of the vehicle is functional, the vehicle computing system may activate one or more such components (e.g., sensors, planning components, perception components, emitters, drive systems, communications systems, etc.) in preparation for further checks and/or service. Alternatively or additionally, any other reconfigurations and enabling and/or disabling operations may be performed based on satisfaction of a subsequent set of checks.

An example 140 illustrates the example vehicle 106 located at a home base following satisfaction of a subsequent set of checks determined by a vehicle inspection system that may be configured at the operator device 112 operated by operator 110. As the vehicle 106 has passed the subsequent set of checks, the vehicle inspection system may reconfigure the vehicle 106, for example, by enabling drive components of the vehicle 106. This may allow the operator 110 the ability to remotely control the vehicle 106 to move to a position 142 among the other vehicles 108 at the home base. For example, following the subsequent set of checks, the operator 110 may remotely control the vehicle to a bank of chargers for charging.

The process 100 may then return to operations 128 to determine whether there are any additional checks to be performed on the vehicle. As described above, if no other checks are to be performed (e.g., at this time), the vehicle may be moved to a position and/or placed in a condition to await its next service activation or other activity. If other checks are to be performed, the process may return to operation 130 to conduct such checks. Any number and type of checks and sets of checks may be performed, including those performed when a vehicle returns to a home base, those performed in preparation for a vehicle leaving home base (e.g., entering active service), and/or those performed at any other point in a vehicle's lifecycle. As will be appreciated, all such checks and sets of checks may be integrated into the process 100.

Figure 2:
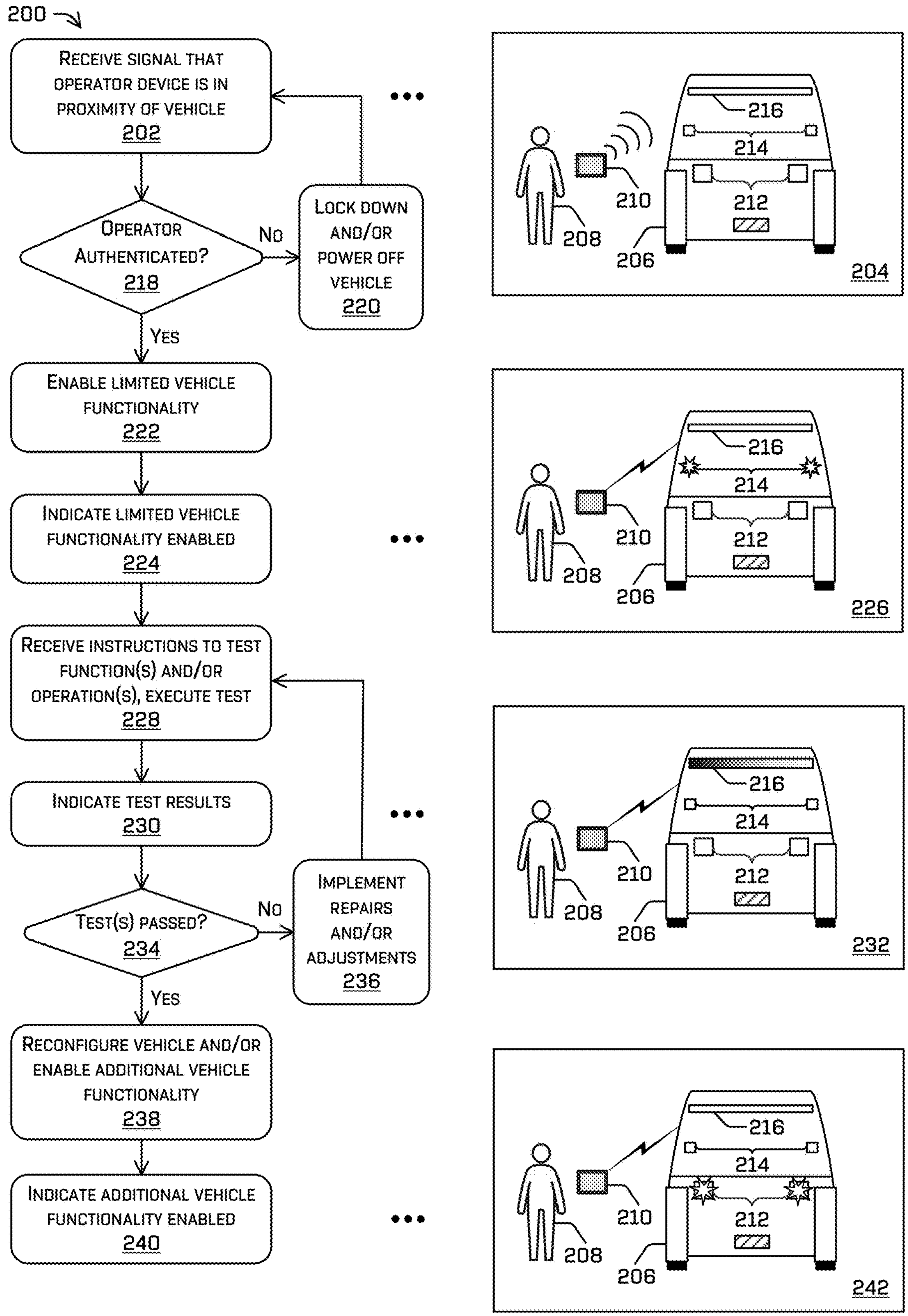
FIG. 2 illustrates an example process for determining vehicle condition data and vehicle configurations, in accordance with examples of the disclosure.

FIG. 2 is a pictorial flow diagram of an example process 200 for determining vehicle condition data and vehicle configurations based on such vehicle state data and/or operator input. In examples, one or more operations of the process 200 may be implemented by a vehicle inspection system or other computing system external to a vehicle and/or a vehicle computing system, such as by using one or more of the components and systems illustrated in FIG. 5 and described below. For example, such one or more components and systems can include those associated with the computing device 542, such as the vehicle inspection component 552, and/or the vehicle computing device 504, such as vehicle inspection component 532, illustrated in FIG. 5. In examples, the one or more operations of the process 200 may be performed by a combination of a remote system and a vehicle computing systems. However, the process 200 is not limited to being performed by such components and systems, and the components and systems of FIG. 5 are not limited to performing the process 200.

At operation 202, a vehicle computing system (e.g., a vehicle inspection component of a vehicle computing system) may detect a signal from a proximate computing system, such as a fleet operator's vehicle inspection system. For example, the vehicle may have recently returned to a home base from active service. Alternatively or additionally, the vehicle may be parked or stored at an area of a home base (e.g., a charging station) and not currently in active service. The vehicle may be currently locked down, hibernating, in a low power mode, and/or otherwise largely inactive. However, one or more short-range and/or NFC components may be active on the vehicle and capable of interaction with the vehicle computing system. At operation 202, one or more such components may detect a signal from an operator device. By nature of short-range and/or NFC signals, detecting such a signal may indicate that the device emitting such a signal is physically proximate to the detecting component. Further at operation 202, the vehicle computing system may establish a communications session with the device emitting the detected signal for purposes of authenticating the device and/or its associated user.

An example 204 illustrates a vehicle 206 that may detect (e.g., using one or more short-range wireless or NFC components) a signal from a device 210 that may be operated by an operator 208. The device 210 may be or include a vehicle inspection system. A vehicle computing device of the vehicle 206 may interact with the device 210 (e.g., using short-range wireless or NFC communications) to attempt to authenticate the operator 208 and/or the device 210. Once authenticated, the vehicle computing system of the vehicle 206 and the device 210 may continue communications via short-range or NFC means or may transition to more robust communications means (e.g., Wi-Fi, cellular data, etc.).

The vehicle 206 may be configured with one or more visual and/or audible indicators. For example, the vehicle 206 may be configured with indicators 212, 214, and 216, that may individually be a single color light emitter ("lamp") or an emitter capable of emitting multiple colors of light. The indicators 212, 214, and 216 may individually also, or instead, be sound emitters capable of emitting one or several audible sound frequencies.

At operation 218, the vehicle computing system may determine whether the operator and/or the operator device have been successfully authenticated. If not, at operation 220 the vehicle computing system may maintain or place the vehicle in a lockdown and/or largely inactive state, prohibiting access to the vehicle and/or (e.g., remote) control over the vehicle.

If the operator and/or the operator device have been successfully authenticated (and, for example, communications have been established between the operator device and the vehicle computing system), at operation 222, the vehicle computing system may enable (e.g., limited) functionality at the vehicle. For example, the vehicle computing system may receive an instruction from a vehicle inspection system (e.g., operating as part of or via the operator device) to enable and/or configure particular functionality at the vehicle. Alternatively, the vehicle computing system may be configured to (e.g., automatically) enable and/or configure particular functionality at the vehicle based on authenticating an operator or operator device and/or establishing communications with a vehicle inspection system.

The functionality and/or configurations enabled at operation 222 may include any of those described herein and/or any other functionality and/or configurations that may be implemented at a vehicle. For example, the vehicle computing system and/or the vehicle inspection system may unlock the doors and activate interior lights to enable a visual inspection. Alternatively or additionally, the vehicle computing system and/or the vehicle inspection system may configure one or more vehicle components for low speed travel and maneuvers and/or limited distance travel so that an operator may remotely control the vehicle to travel within a home base. Alternatively or additionally, the vehicle computing system and/or the vehicle inspection system may enable exterior emitters to be capable of emitting light and/or sound to provide indications to operators outside of the vehicle of vehicle status and/or condition. In various examples, such functionalities may be determined based at least in part on the particular authenticated user. As a non-limiting example of which, though some users may be able to open doors and control the vehicle to move around an area, other users may be restricted from either opening the doors and/or moving the vehicle. Such mappings of users to functions may be stored in a remote server accessible to the vehicle computing system and/or to the vehicle inspection system and may be used to inform the vehicle computing system and/or the vehicle inspection system of particular functions that may be enabled for particular users (e.g., upon user authentication).

At operation 224, the vehicle computing system may indicate the currently enabled functionality at the vehicle. In examples, the currently enabled functionality may be indicated via a vehicle inspection system (e.g., on a display of a device that is a component of, or includes, the vehicle inspection system). Alternatively or additionally, the currently enabled functionality of the vehicle may be indicated using one or more exterior emitters configured at the vehicle. For example, a vehicle may be configured with one or more visual and/or audible indicators as described above in regard to example 204. If the vehicle doors are unlocked and the vehicle is stationary (e.g., parking or other brake applied), one or more such emitters may emit a steady green light. If the vehicle is configured for and capable of movement but is stationary, one or more such emitters may emit a steady red light. If the vehicle is currently under remote control and/or in motion, one or more such emitters may flash orange light and emit a beeping sound. As will be appreciated, any combination of lights and/or sounds may be used to externally indicate a vehicle condition or status.

In examples, a vehicle inspection system may transmit a signal to the vehicle computing system that causes the activation of one or more emitters or other indicators. For example, a vehicle inspection system may transmit one or more instructions to the vehicle computing system that instruct the vehicle computing system to activate (e.g. in some particular manner) one or more emitters or indicators. Alternatively or additionally, the vehicle inspection system may transmit a signal representing particular data (e.g., data indicating a check result, the results of a set of checks, one or more vehicle conditions, etc.). The vehicle computing system may be configured to activate one or more emitters or indicators based on such received data.

An example 226 illustrates the vehicle computing system of the vehicle 206 in communication with the device 210 that may include, or be a component of, a vehicle inspection system. The vehicle 206 may be configured with limited functionality, such as unlocked doors, and may be in a particular condition, such as stationary with a parking brake engaged. These conditions may be indicated by the indicator 214 that may, for example, be emitting a steady green light.

At operation 228, the vehicle inspection system may provide one or more instructions to the vehicle computing system and/or to an operator to perform one or more tests, checks, and/or operations, such as any of the checks described herein. These instructions may be for a set of checks and may be sequentially provided and/or provided in parallel to one or both of the vehicle computing system and the operator. These instructions may include instructions to perform automated self-checks (e.g., by the vehicle computing system) and/or instructions to perform manual checks (e.g., by the operator).

At operation 230, the results of one or more of the tests or checks may be indicated. In examples, the results of one or more checks or tests may be indicated via the vehicle inspection system (e.g., on a display of a device that is a component of, or includes, the vehicle inspection system). Alternatively or additionally, the results of one or more checks or tests may be indicated using one or more exterior emitters configured at the vehicle. For example, if the vehicle computing system determines that one or more tests run as self-checks of one or more vehicle components has failed, the vehicle computing system may control an emitter to emit a blinking red light and/or a beeping. If the vehicle computing system determines that all checks performed as part of a set of self-checks are successful, the vehicle computing system may control an emitter to emit a steady green light (e.g., with no sound). If the vehicle computing system determines that a check is deficient but not critical (e.g., a tire with relatively low pressure, but that is not flat, is detected), the vehicle computing system may control an emitter to emit a yellow blinking light. As will be appreciated, any combination of lights and/or sounds may be used to externally indicate the results of one or more tests or checks.

An example 232 illustrates again the vehicle computing system of the vehicle 206 in communication with the device 210 that may include, or be a component of, a vehicle inspection system. The vehicle 206 may have performed one or more self-checks of one or more of its components. These results of one or more of these self-checks may be indicated by the indicator 216 that may, for example, emit a light of a color corresponding to the results of the self-checks. For instance, the indicator 216 may emit a steady green light when all self-checks in a set of checks have been satisfied. Alternatively, the indicator 216 may emit repeat a number of red pulses of light corresponding to an identifier of a self-check that failed. For instance, if self-check number three fails, the indicator 216 may repeatedly emit a pattern of three pulses of red light followed by a pause to indicate that the third self-check failed.

At operation 234, the vehicle inspection system may determine whether the tests and/or checks performed at operation 228 and/or indicated at operation 230 were successful. If not, at operation 236, repairs and/or adjustments may be performed. For example, the vehicle may be configured for movement and controlled to a repair and/or maintenance area where one or more repair or maintenance operations may be performed.

If the vehicle inspection system determines at operation 234 that the tests and/or checks performed at operation 228 and/or indicated at operation 230 were successful, at operation 238 the vehicle inspection system may reconfigure (e.g., via instructions or a signal) the vehicle and/or enable functionality based on the successful completion of the tests and/or checks. For example, drive components of the vehicle may be enabled, the vehicle may be configured to be moved using remote control, etc. Any configurations, reconfigurations, and/or any other operations that may be used to enable or disable one or more vehicle functions, for example as described herein, may be performed at operation 238.

At operation 240, the reconfiguration(s) and/or functionalities enabled at operation 238 may be indicated. In examples, the enabled functionality may be indicated via a vehicle inspection system (e.g., on a display of a device that is a component of, or includes, the vehicle inspection system). Alternatively or additionally, the enabled functionality of the vehicle may be indicated using one or more of the exterior emitters configured at the vehicle. For example, if the vehicle is now configured for and capable of movement, one or more such emitters may emit a steady red light. If the vehicle is currently under remote control and/or in motion, one or more such emitters may flash orange light and emit a beeping sound. As will be appreciated, any combination of lights and/or sounds may be used to externally indicate a vehicle condition or status.

An example 242 illustrates the vehicle computing system of the vehicle 206 in communication with the device 210 that may include, or be a component of, a vehicle inspection system. The vehicle 206 may be configured with movement functionality and may currently be under remote control of the operator 208 via the device 210. These conditions may be indicated by the indicator 212 that may, for example, be flashing a red light and/or emitting a beeping sound.

Figure 3:
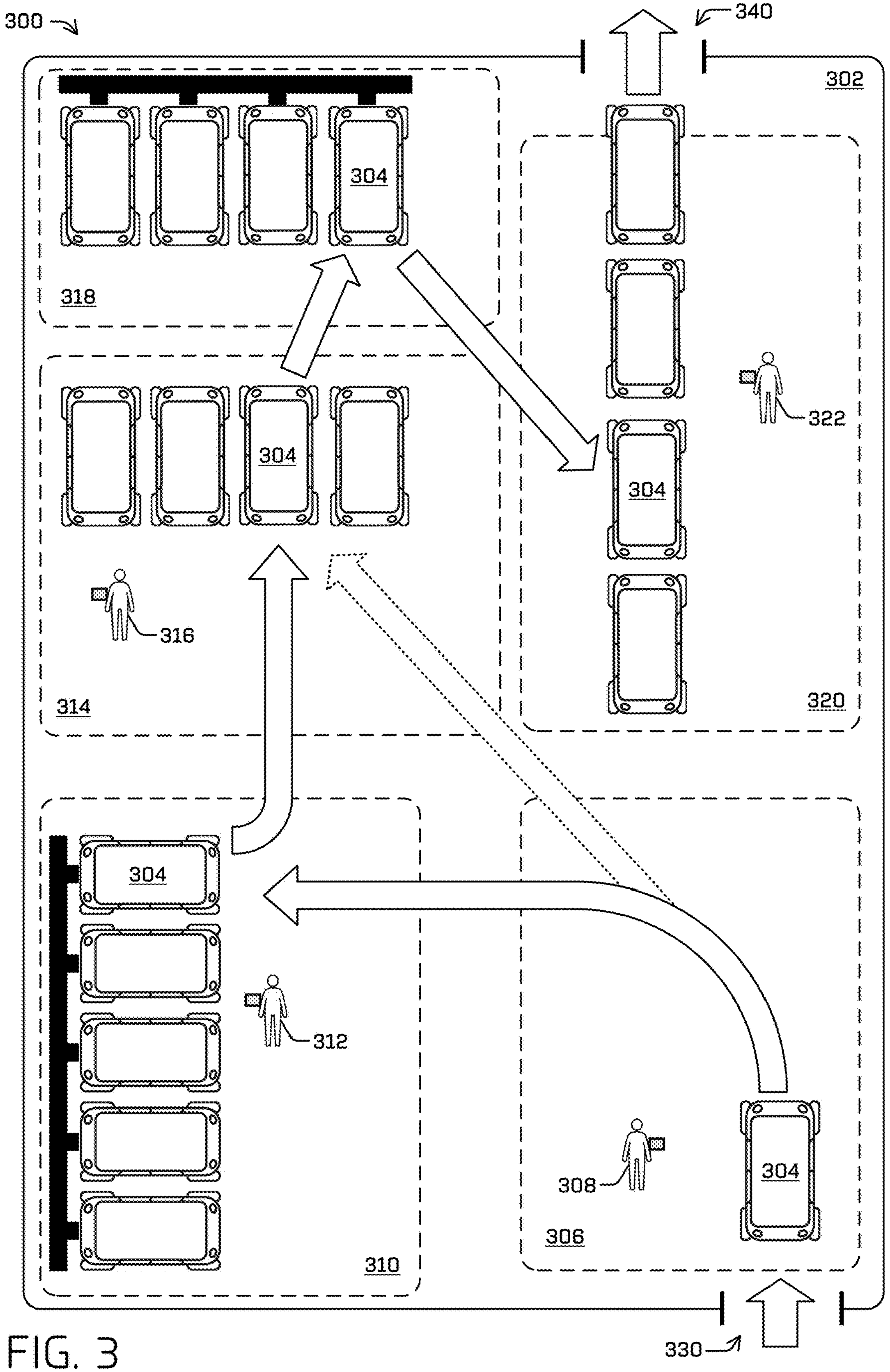
FIG. 3 depicts an example environment in which the vehicle inspection techniques disclosed herein may be implemented, in accordance with examples of the disclosure.

FIG. 3 illustrates environment 300 that may include an example home base 302 and an example vehicle 304 that may be operated (remotely and/or autonomously) within the home base 302. The vehicle 304 may be an autonomous vehicle associated with a fleet of autonomous vehicles associated with the home base 302. The home base 302 may serve as a storage, inspection, maintenance, and/or repair facility for vehicles in the fleet.

The vehicle 304 may be an autonomous vehicle that may be in active service (e.g., as a taxi, delivery vehicle, etc.) periodically. The vehicle 304 may enter the home base 302 via an entrance 330. In examples, the vehicle 304 may return to the home base 302 after a predetermined period of time of active service and/or in response to one or more conditions. For example, the vehicle 304 may be configured to operate in active service for a set number of hours (e.g., 8, 12, 16, etc.) before returning to the home base 302. Alternatively or additionally, the vehicle 304 may be configured to return to the home base 302 in response to detecting a low battery condition, a low tire pressure condition, one or more other maintenance issues, and/or one or more other faults or malfunctions. Alternatively or additionally, the vehicle 304 may be configured to return to the home base 302 in response to receiving an instruction to do so, for example, from a teleoperator or other operator.

On entering the home base 302, the vehicle 304 may initially enter a "landing" area 306. An initial set of checks may be performed at the landing area 306, for example, by an operator 308 operating a vehicle inspection system. One or more additional operators may be present at area 306 and/or any other area described herein and/or configured at a home base (e.g., to assist in ensuring the area around a moving vehicle is clear and/or other people in the area are aware of the vehicle.). Any one or more of the checks, tests, etc. described herein or otherwise may be performed at this area.

If the vehicle inspection system determines, while performing a set of checks at the landing area 306, that the vehicle 304 has failed one or more of the checks, the vehicle 304 may be configured (e.g., by the vehicle inspection system) with motion capabilities sufficient to allow remote control or autonomous movement of the vehicle 304 to a repair area 310. If the vehicle inspection system determines that the vehicle 304 has passed the set of checks performed at the landing area 306, the vehicle 304 may be configured (e.g., by the vehicle inspection system) with motion capabilities and/or one or more other functionalities that may facilitate further checks and/or operations. For example, the operator 308 may remotely control the vehicle 304 to an inspection area 314.

At the repair area 310, vehicles such as the vehicle 304 may undergo repairs, maintenance, software upgrades, etc. While in the area 310, the vehicle 304 may interact with the vehicle inspection system and an operator 312. When the vehicle 304 has completed the determined repairs and/or maintenance, the vehicle 304 may be moved to the inspection area 314 (e.g., by the operator 312 using remote control or via autonomous movement).

At the inspection area 314, vehicles such as the vehicle 304 may undergo further checks. In examples, a more detailed and thorough set of checks may be performed in this area (as opposed to the landing area 306). For example, the vehicle 304 may be inspected for cleanliness, damage, proper signage, etc. While in the area 314, the vehicle 304 may interact with the vehicle inspection system and an operator 316. If the vehicle inspection system determines that there are repairs or other maintenance needed to the vehicle 304, the vehicle 304 may be configured (e.g., by the vehicle inspection system) with motion capabilities sufficient to allow remote control or autonomous movement of the vehicle 304 to the repair area 310.

If the vehicle 304 passes the checks performed at the inspection area 314, the vehicle 304 may be configured (e.g., by the vehicle inspection system) with capabilities sufficient to allow remote control or autonomous movement of the vehicle 304 to a staging area 318. In examples, the vehicle 304 may await its next service interval at the staging area 318. The vehicle 304 may charge while in this area and/or may otherwise be stored in the area 318 until instructed to perform other operations.

When the vehicle 304 is to be returned to active service, it may be remotely or autonomously controlled to a launch area 320. While in the area 320, the vehicle 304 may interact with the vehicle inspection system and an operator 322. A further set of checks may be performed on the vehicle 304 at the launch area 320 to ensure that the vehicle is in good condition to enter active service. If the vehicle inspection system determines that there are repairs or other maintenance needed to the vehicle 304, the vehicle 304 may be configured (e.g., by the vehicle inspection system) with motion capabilities sufficient to allow remote control or autonomous movement of the vehicle 304 to the repair area 310. If the vehicle inspection system determines that the vehicle 304 is in condition for active service, the full capabilities of the vehicle 304 (e.g., full autonomous capabilities) may be configured at the vehicle 304 and/or teleoperations may be provided control of the vehicle 304. The vehicle 304 may then depart the home base 302 via the exit 340 and begin active service.

Figure 4:
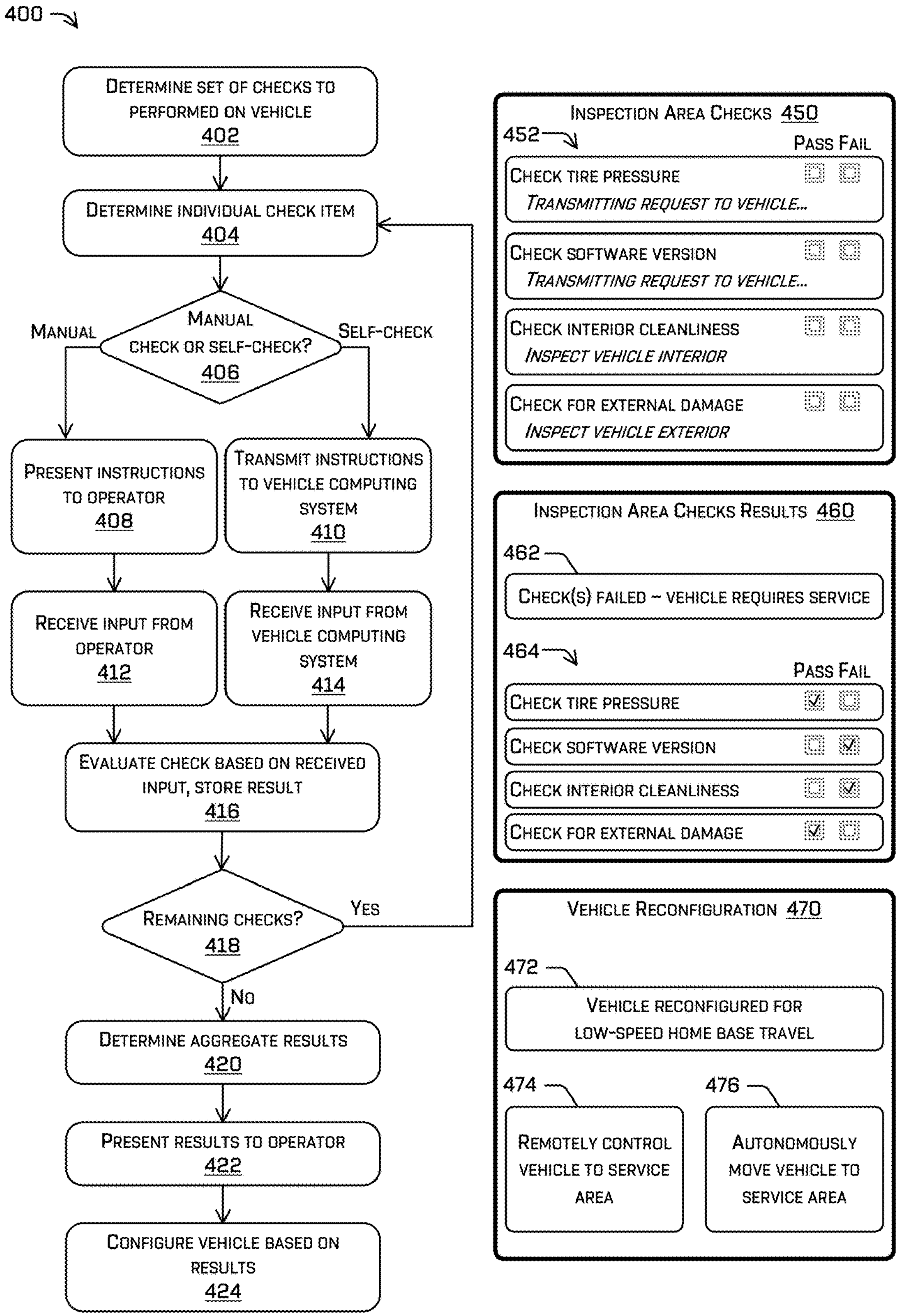
FIG. 4 illustrates an example process for determining vehicle condition data and vehicle configurations, in accordance with examples of the disclosure.

FIG. 4 is a pictorial flow diagram of an example process 400 for determining vehicle condition data and vehicle configurations based on such vehicle state data and/or operator input. In examples, one or more operations of the process 400 may be implemented by a vehicle inspection system or other computing system external to a vehicle and/or a vehicle computing system, such as by using one or more of the components and systems illustrated in FIG. 5 and described below. For example, such one or more components and systems can include those associated with the computing device 542, such as the vehicle inspection component 552, and/or the vehicle computing device 504, such as vehicle inspection component 532, illustrated in FIG. 5. In examples, the one or more operations of the process 400 may be performed by a combination of a remote system and a vehicle computing systems. However, the process 400 is not limited to being performed by such components and systems, and the components and systems of FIG. 5 are not limited to performing the process 400.

At operation 402, a vehicle inspection system may determine a set of checks to be performed on a vehicle, such as an autonomous vehicle. In various examples, the vehicle inspection system may be operated by a fleet operator and/or system operators associated with the fleet operator and used to implement checks, vehicle reconfigurations, vehicle control, and other aspects of the vehicle inspection and configuration techniques described herein. In examples, the vehicle inspection system may determine a set of checks based on a vehicle state and/or location. For example, if a vehicle is being prepared for active service and/or is located in a launch area at a home base that is used to inspect vehicles before they begin active service, the vehicle inspection system may determine a pre-launch set of checks to be performed on the vehicle. Alternatively, if a vehicle has just returned from active service and/or is located in a landing area at a home base that is used to inspect vehicle after they complete a period of active service, the vehicle inspection system may determine a landing set of checks to be performed on the vehicle. Other vehicle states and/or locations (e.g., intermediate states and/or locations at a home base) may be used to determine a set of checks. Any set of checks that include any one or more checks, tests, and/or vehicle evaluations of any typo, including those described herein, may be determined at operation 402. Furthermore, any combination of one or more manual and/or self-checks may be included in the set of checks determined at operation 402.

Example interface 450 may present an exemplary determined set of checks 452 for an inspection area that may be determined by a vehicle inspection system. The set of checks 452 may include self-checks that may be performed by a vehicle computing system and/or a vehicle inspection system, such as checking tire pressure using tire pressure sensors and/or checking a software version of one or more vehicle components by a computing system that may interact with and/or be configured at the vehicle. The set of checks 452 may also, or instead, include manual checks that may be performed by a human operator. For example, the set of checks 452 may include checking the interior of the vehicle for cleanliness and/or checking the exterior of the vehicle for visible damage.

At operation 404, the vehicle inspection system may determine an individual check item from among the set of checks determined at operation 402. In examples, the vehicle inspection system may perform and/or gather data for the checks in a set of checks sequentially (e.g., complete one before proceeding to another). Alternatively or additionally, the vehicle inspection system may perform and/or gather data for the checks in a set of checks in parallel (e.g., perform or gather data for multiple checks substantially simultaneously). Accordingly, multiple iterations of the any subset of the operations of process 400 may be performed in parallel or sequentially.

At operation 406, the vehicle inspection system may determine whether the check item determined at operation 404 is a manual activity (e.g., human-involved) or a self-check activity (e.g., automatedly performed by one or more components without significant human involvement).

If the check is a manual check, at operation 408 the vehicle inspection system may present instructions to an operator to perform the manual check. For example, referring again to example interface 450 and exemplary determined set of checks 452, for the individual manual items of the checks in the set of checks 452, the vehicle inspection system may indicate instructions for an operation. For instance, the interior cleanliness check in the exemplary set of checks 452 may instruct the operator to inspect the interior of the vehicle (e.g., for cleanliness). Similarly, the exterior damage check in the exemplary set of checks 452 may instruct the operator to inspect the exterior of the vehicle (e.g., for damage).

At operation 412, the vehicle inspection system may receive input data from the operator regarding the manual checks. In examples, the vehicle inspection system may present an interface soliciting input from the operator. This input may take the form of a selection of one or more discrete options or may be open-ended (e.g., a textbox, a submission form for submitting audio, video, images, etc.). Referring again to the example interface 450 and exemplary determined set of checks 452, for the individual manual items of the checks in the set of checks 452, the vehicle inspection system may provide an individual check box for "pass" and "fail" for individual checks in the set of checks, allowing the operator to provide binary input regarding the individual checks.

If the check is determined to be a self-check at operation 406, at operation 410 the vehicle inspection system may generate and transmit instructions to a vehicle computing system instructing the system to perform the self-check. For example, referring again to example interface 450 and exemplary determined set of checks 452, for the individual self-check items of the set of checks 452, the vehicle inspection system may (e.g., automatically) initiate a query for the check data from the vehicle computing system and may indicate that a request for such data has or is being transmitted to the vehicle. For instance, the tire pressure check in the exemplary set of checks 452 may indicate that the vehicle inspection system is transmitting a request for tire pressure sensor data to the vehicle (e.g., to the vehicle computing system). Similarly, the software version check in the exemplary set of checks 452 may indicate that the vehicle inspection system is transmitting a request for software version data to the vehicle (e.g., to the vehicle computing system).

At operation 414, the vehicle inspection system may receive input data from the vehicle computing system in response to the requests transmitted to vehicle computing system for data associated with the checks. Referring again to the example interface 450 and exemplary determined set of checks 452, for the individual self-check items of the set of checks 452, the vehicle inspection system may receive, from a vehicle computing system, responsive data. For example, for the tire pressure check, the vehicle inspection system may receive a tire pressure value or associated data (e.g., a detected pressure and/or an indication that pressure is within or outside a range of pressures; data for individual tires or aggregated data (e.g., "one or more low tires")) from the vehicle computing system. Similarly, for the software version check, the vehicle inspection system may receive a software version or associated data (e.g., a specific software version or a general state of the software (e.g., "software is up to date")) from the vehicle computing system.

At 416, the vehicle inspection system may evaluate the check based on the data received and store the result. For example, the vehicle inspection system may determine whether the vehicle has passed or failed the check and/or a score for the check based on the data received from the operator and/or the vehicle computing system.

At operation 418, the vehicle inspection system may determine whether there are remaining checks to be performed in the set of checks determined at operation 402. If so, the vehicle inspection system may return to operation 404 to perform one or more additional checks.

If there are no further checks to be performed for the set of checks determined at operation 402, at operation 420 the vehicle inspection system may determine aggregated results for the set of checks. For example, the vehicle inspection system may determine an overall score and/or pass/fail value for the set of checks based on the results of the individual checks in the set. In various examples, the vehicle inspection system may determine that the vehicle has failed the set of checks if the vehicle has failed one or more individual checks. Alternatively, the vehicle inspection system may determine that the vehicle has failed the set of checks if the vehicle has failed a threshold number or percentage of individual checks (e.g., two or more, three or more, 10%, 25%, 50%, etc.). Alternatively, where the results of checks may be more granular (e.g., may have a numerical value, for example within a range of values (e.g., a score between 1-10, 0-100, etc.)), the vehicle inspection system may determine an aggregate score by averaging the individual scores and/or using a formula. The vehicle inspection system may then determine that the vehicle has failed the set of checks if the aggregated score is below a threshold score. Any other means of determining whether a vehicle has passed a check or set of checks may be used.

The results of the set of checks may be presented to an operator at operation 422. Example interface 460 may present the aggregated results 462 and the individual results 464 of the set of checks 452 from example interface 450 that may have been performed for a vehicle by the vehicle inspection system. The individual results 464 included in interface 460 may indicate the results for individual checks. For example, the vehicle may have passed the tire pressure check and the eternal damage check but may have failed the software version check and the interior cleanliness check, as shown in this example. The aggregated results 462 included in interface 460 may indicate that the vehicle has failed the set of checks and may need additional service, also as shown in this example.

At operation 424, the vehicle inspection system may configure the vehicle based on the results of the set of checks. For example, if the vehicle has passed a set of checks, the vehicle inspection system may configure the vehicle for the next operation or activity of a fully operable vehicle (e.g., proceed to the next inspection area, prepare for service, charging, etc.). If the vehicle has failed a set of checks, the vehicle inspection system may configure the vehicle for addressing the failed checks (e.g., proceed to repair area, prepare for maintenance and/or software upgrade, etc.). In either case, the vehicle inspection system may reconfigure one or more components on the vehicle. For example, the vehicle inspection system may configure the vehicle for low speed and/or limited distance remotely controlled motion within a home base, fully autonomous operation (e.g., with unlimited distance travel) for active service, power up and/or down one or more components, lock/unlock doors and/or compartments, etc. The vehicle inspection system may indicate, at operation 424, the reconfigurations and/or other operations performed on a vehicle based on the results of the set of checks and/or one or more additional actions that may be taken (e.g., in response to operator input).

Example interface 470 may present such information to an operator, for example, in response to determining that a vehicle has failed a set of checks such as those of examples interfaces 450 and 460. Interface element 472 may indicate to the operator that the vehicle has been reconfigured for low speed home base travel (e.g., to facilitate safe movement of the vehicle to a repair and/or maintenance area to address the failed checks). Control elements 474 and 476 may allow the operator to determine the means of moving the vehicle to the repair and/or maintenance area. For example, in response to an operator selection of control element 474, the vehicle inspection system may present a remote control interface to the operator that allows the operator to remotely control the vehicle (e.g., to move the vehicle to the repair and/or maintenance area). In response to an operator selection of control element 476, the vehicle inspection system may instruct the vehicle computing system of the vehicle to autonomously travel to the repair and/or maintenance area). Of course, any other options for vehicle control and additional activities may be presented to the operator.

FIG. 5 depicts a block diagram of an example system 500 for implementing the techniques described herein. In at least one example, the system 500 can include a vehicle 502. The vehicle 502 can include a vehicle computing system or device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a planning component 524, one or more system controllers 526, one or more maps 528, a prediction component 530, and/or a vehicle inspection component 532. Though depicted in FIG. 5 as residing in memory 518 for illustrative purposes, it is contemplated that each of the localization component 520, the perception component 522, the planning component 524, the one or more system controllers 526, the one or more maps 528, the prediction component 530, and/or the vehicle inspection component 532 can additionally, or alternatively, be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, and yaw (h)). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization, and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data.

In some instances, the perception component 522 can include functionality to perform object detection, segmentation, and/or classification. In some examples, the perception component 522 can provide processed sensor data that indicates a presence of an entity that is proximate to the vehicle 502 (e.g., a human operator and/or an operator device) and/or a classification of the entity as an entity type (e.g., car, pedestrian, cyclist, animal, building, tree, road surface, curb, sidewalk, traffic signal, traffic light, car light, brake light, unknown, etc.). In additional or alternative examples, the perception component 522 can provide processed sensor data that indicates one or more characteristics associated with a detected entity (e.g., a tracked object) and/or the environment in which the entity is positioned. The perception component 522 may use one or more multichannel data structures, such as the multichannel data structures generated by a deconvolution process, to generate processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Such entity characteristics may be represented in a multichannel data structure (e.g., a multichannel data structure generated as output of one or more deconvolution layers (e.g., learned deconvolutional upsampling decoding layer(s)) using a learned upsampling transformation). Characteristics associated with the environment can include, but are not limited to, a presence of another entity in the environment, a state of another entity in the environment, a time of day, a day of a week, a season, a weather condition, an indication of darkness/light, etc.

In general, the planning component 524 may determine a path for the vehicle 502 to follow to traverse through an environment. In examples, the planning component 524 can determine various routes and trajectories and various levels of detail. For example, the planning component 524 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints may include streets, intersections, global positioning system (GPS) coordinates, etc. Further, the planning component 524 can generate an instruction (e.g., control) for guiding the autonomous vehicle along at least a portion of the route from the first location to the second location. In at least one example, the planning component 524 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 526, which can be configured to control steering, propulsion, braking, safety, emitters, communication, and other systems of the vehicle 502. These system controller(s) 526 can communicate with and/or control corresponding systems of the drive system(s) 514 and/or other components of the vehicle 502. For example, capabilities of the drive system(s) 514 may be controlled by the system controller(s) 526 based on instructions received from the vehicle inspection component 532 and/or the vehicle inspection component 552.

The memory 518 can further include one or more maps 528 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 528 can include at least one map (e.g., images and/or a mesh). In some examples, the vehicle 502 can be controlled based at least in part on the maps 528. That is, the maps 528 can be used in connection with the localization component 520, the perception component 522, and/or the planning component 524 to determine a location of the vehicle 502, identify objects in an environment, and/or generate routes and/or trajectories to navigate within an environment.

In some examples, the one or more maps 528 can be stored on a remote computing device(s) (such as the computing device(s) 542) accessible via network(s) 540. In some examples, multiple maps 528 can be stored based on, for example, a characteristic (e.g., type of entity, time of day, day of week, season of the year, etc.). Storing multiple maps 528 can have similar memory requirements but increase the speed at which data in a map can be accessed.

In general, the prediction component 530 can generate predicted trajectories of objects in an environment. For example, the prediction component 530 can generate one or more predicted trajectories for vehicles, pedestrians, animals, and the like within a threshold distance from the vehicle 502. In some instances, the prediction component 530 can measure a trace of an object and generate a trajectory for the object based on observed and predicted behavior.

In some instances, aspects of some or all of the components discussed herein can include any models, algorithms, and/or machine learning algorithms. For example, in some instances, the components in the memory 518 (and the memory 546, discussed below) can be implemented as a neural network. For instance, the memory 518 may include a deep tracking network that may be configured with a convolutional neural network (CNN). The CNN may include one or more convolution/deconvolution layers.

An example neural network is an algorithm that passes input data through a series of connected layers to produce an output. Each layer in a neural network can also comprise another neural network or can comprise any number of layers, each of which may be convolutional, deconvolutional, or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 506 can include radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), time of flight sensors, audio sensors, acoustic sensors, microphones, wheel encoders, environment sensors (e.g., temperature sensors, humidity sensors, light sensors, pressure sensors, etc.), etc. The sensor system(s) 506 can include multiple instances of each of these or other types of sensors. For instance, the camera sensors can include multiple cameras disposed at various locations about the exterior and/or interior of the vehicle 502. The sensor system(s) 506 can provide input to the vehicle computing device 504. Additionally, or alternatively, the sensor system(s) 506 can send sensor data, via the one or more networks 540, to the one or more computing device(s) at a particular frequency, after a lapse of a predetermined period of time, in near real-time, etc. The sensor system(s) 506 may, in some examples, be controlled or configured by the vehicle inspection component 532 and/or the vehicle inspection component 552 as described herein.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 in this example may also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters. The emitter(s) 508 may, in some examples, be controlled or configured by the vehicle inspection component 532 and/or the vehicle inspection component 552 as described herein.

The vehicle 502 can also include one or more communication connection(s) 510 that enable communication between the vehicle 502 and one or more other local or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals, etc.). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 540. For example, the communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle. In some instances, the direct connection 512 can further releasably secure the drive system(s) 514 to the body of the vehicle 502.

In some examples, the vehicle 502 can send sensor data, audio data, collision data, and/or other types of data to one or more computing device(s) 542 via the network(s) 540. In examples, the networks 540 include Wi-Fi, short-range, and NFC communications means. In some examples, the vehicle 502 can send raw sensor data to the computing device(s) 542. In other examples, the vehicle 502 can send processed sensor data and/or representations of sensor data (e.g., multichannel data structures representing sensor data) to the computing device(s) 542. In some examples, the vehicle 502 can send sensor data to the computing device(s) 542 at a particular frequency, after a lapse of a predetermined period of time, in near real-time, etc. In some cases, the vehicle 502 can send sensor data (raw or processed) to the computing device(s) 542 as one or more log files. In some examples, the vehicle inspection component 532 may send vehicle check data to the computing device(s) 542, and in examples, to the vehicle inspection component 552.

The computing device(s) 542 can include processor(s) 544 and a memory 546 storing one or more perception components 548, and/or planning components 550. In some instances, the perception component 548 can substantially correspond to the perception component 522 and can include substantially similar functionality. In some instances, the planning component 550 can substantially correspond to the planning component 524 and can include substantially similar functionality. The vehicle inspection component 552 may execute and/or otherwise perform operations associated with a vehicle inspection system as described herein. The vehicle inspection component 552 may interact with the vehicle computing device 504 to do so, and in examples, with the vehicle inspection component 532.

The processor(s) 516 of the vehicle 502 and the processor(s) 544 of the computing device(s) 542 can be any suitable processor capable of executing instructions to process data and perform operations as described herein. By way of example and not limitation, the processor(s) 516 and 544 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 518 and 546 are examples of non-transitory computer-readable media. The memory 518 and 546 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 542 and/or components of the computing device(s) 542 can be associated with the vehicle 502. That is, the vehicle 502 can perform one or more of the functions associated with the computing device(s) 542, and vice versa.

Example Clauses

The following paragraphs describe various examples. Any of the examples in this section may be used with any other of the examples in this section and/or any of the other examples or embodiments described herein A: A system comprising: one or more processors; and one or more non-transitory computer-readable media storing computer-executable instructions that, when executed, cause the system to perform operations comprising: transmitting, to a vehicle computing system of an autonomous vehicle, a first request for first condition data for a first component of the autonomous vehicle; receiving, from the vehicle computing system, the first condition data; determining, based on the first condition data, a first vehicle condition; transmitting, to the vehicle computing system, based at least in part on the first vehicle condition, a first signal that causes the vehicle computing system to modify a second component of the autonomous vehicle in accordance with a first configuration; transmitting a second request for second condition data for a third component of the autonomous vehicle; receiving the second condition data; determining, based on the second condition data, a second vehicle condition; and transmitting, to the vehicle computing system, based at least in part on the second vehicle condition, a second signal that causes the vehicle computing system to modify the second component in accordance with a second configuration.

B: The system of paragraph A, wherein the first signal further causes the vehicle computing system to activate one or more of a light emitter or a sound emitter.

C: The system of paragraph A or B, wherein the first signal that causes the vehicle computing system to modify the second component comprises a signal that causes the vehicle computing system to limit one or more of a speed of the autonomous vehicle or a travel distance of the autonomous vehicle.

D: The system of any of paragraphs A-C, wherein receiving the second condition comprises receiving input from an operator via a graphical user interface element.

E: The system of any of paragraphs A-D, wherein the first signal further causes the vehicle computing system to activate one or more of a light emitter or a sound emitter.

F: One or more non-transitory computer-readable media storing instructions that, when executed by one or more processors, perform operations comprising: transmitting, to a vehicle computing system associated with a vehicle, authentication data that causes the vehicle computing system to configure the vehicle in accordance with a first configuration; receiving, from the vehicle computing system, first condition data associated with a first component of the vehicle; determining, based on the first condition data, a first vehicle condition; transmitting, to the vehicle computing system, based at least in part on the first vehicle condition, a first signal that causes the vehicle computing system to modify the vehicle in accordance with a second configuration; receiving second condition data associated with a second component of the vehicle; determining, based on the second condition data, a second vehicle condition; and presenting, on a graphical user interface, an indication of one or more of the first vehicle condition or the second vehicle condition.

G: The one or more non-transitory computer-readable media of paragraph F, wherein: the vehicle is at a first location; and the first signal comprises one or more instructions to move the vehicle to a second location that is distinct from the first location.

H: The one or more non-transitory computer-readable media of paragraph F or G, wherein the first signal causes the vehicle computing system to activate one or more of a vehicle door or a vehicle compartment door.

I: The one or more non-transitory computer-readable media of any of paragraphs F-H, wherein the first configuration is based at least in part on a location of the vehicle.

J: The one or more non-transitory computer-readable media of any of paragraphs F-I, wherein first signal causes the vehicle to activate exterior lights configured at the vehicle.

K: The one or more non-transitory computer-readable media of any of paragraphs F-J, wherein the first signal causes the vehicle computing system to disable or limit the function of one or more components of the vehicle.

L: The one or more non-transitory computer-readable media of any of paragraphs F-K, wherein the first signal causes the vehicle computing system to establish communications between the vehicle computing system and one or more components of the vehicle.

M: The one or more non-transitory computer-readable media of any of paragraphs F-L, wherein the operations further comprise transmitting a second signal to the vehicle computing system that causes the vehicle computing system to activate autonomous operating capabilities at the vehicle.

N: The one or more non-transitory computer-readable media of any of paragraphs F-M, wherein the operations further comprise transmitting a second signal to the vehicle computing system indicating a remediation of the first vehicle condition.

O: A method comprising: receiving, from a vehicle computing system configured at a vehicle, first condition data for a first component of the vehicle; determining, based on the first condition data, a first vehicle condition; transmitting, to the vehicle computing system, based at least in part on the first vehicle condition, a first signal to modify the vehicle; receiving second condition data for a second component of the vehicle; determining, based on the second condition data, a second vehicle condition; and presenting, on a graphical user interface, an indication of one or more of the first vehicle condition or the second vehicle condition.

P: The method of paragraph O, wherein one or more of the first vehicle condition or the second vehicle condition is associated with at least one of: a tire pressure; a fluid level; a battery charge; or a software version.

Q: The method of paragraph O or P, wherein the first signal causes the vehicle to autonomously travel from a current location of the vehicle to another location.

R: The method of any of paragraphs O-Q, wherein the first signal causes the vehicle computing system to obtain sensor data from one or more components.

S: The method of any of paragraphs O-R, wherein the first signal causes the vehicle computing system to limit one or more of a speed of the vehicle or a travel distance of the vehicle.

T: The method any of paragraphs O-S, wherein the first signal causes the vehicle computing system to limit control of the vehicle to manual control.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

The invention claimed is:

1. A system comprising:

one or more processors; and one or more non-transitory computer-readable media storing computer-executable instructions that, when executed, cause the system to perform operations comprising:

transmitting, to a vehicle computing system of an autonomous vehicle, a first request for first condition data for a first component of the autonomous vehicle;

receiving, from the vehicle computing system, the first condition data;

determining, based on the first condition data, a first vehicle condition;

transmitting, to the vehicle computing system, based at least in part on the first vehicle condition and a current location of the autonomous vehicle, a first signal that causes the vehicle computing system to move the autonomous vehicle to a different location from the current location and configure a second component of the autonomous vehicle in accordance with a first capability state of the autonomous vehicle, wherein the current location of the autonomous vehicle and the different location are located within a home base of a fleet of autonomous vehicles;

transmitting a second request for second condition data for a third component of the autonomous vehicle;

receiving the second condition data;

determining, based on the second condition data, a second vehicle condition; and transmitting, to the vehicle computing system, based at least in part on the second vehicle condition and the different location, a second signal that causes the vehicle computing system to reconfigure the second component in accordance with a second capability state of the autonomous vehicle.

2. The system of claim 1, wherein the first signal further causes the vehicle computing system to activate one or more of a light emitter associated with the autonomous vehicle or a sound emitter associated with the autonomous vehicle.

3. The system of claim 1, wherein the first signal that causes the vehicle computing system to configure the second component further causes the vehicle computing system to limit one or more of a speed of the autonomous vehicle or a travel distance of the autonomous vehicle.

4. The system of claim 1, wherein receiving the second condition data comprises receiving input from an operator via a graphical user interface element.

5. The system of claim 2, wherein activating the light emitter associated with the autonomous vehicle comprises emitting one or more of colored light, flashing light, or steady light.

6. A method comprising:

transmitting, to a vehicle computing system of an autonomous vehicle, a first request for first condition data for a first component of the autonomous vehicle;

receiving, from the vehicle computing system, the first condition data;

determining, based on the first condition data, a first vehicle condition;

transmitting, to the vehicle computing system, based at least in part on the first vehicle condition and a current location of the autonomous vehicle, a first signal that causes the vehicle computing system to move the autonomous vehicle to a different location from the current location and configure a second component of the autonomous vehicle in accordance with a first capability state of the autonomous vehicle, wherein the current location of the autonomous vehicle and the different location are located within a home base of a fleet of autonomous vehicles;

transmitting a second request for second condition data for a third component of the autonomous vehicle;

receiving the second condition data;

determining, based on the second condition data, a second vehicle condition; and transmitting, to the vehicle computing system, based at least in part on the second vehicle condition and the different location, a second signal that causes the vehicle computing system to reconfigure the second component in accordance with a second capability state of the autonomous vehicle.

7. The method of claim 6, wherein one or more of the first condition data and the second condition data are based at least in part on one or more self-checks executed by the autonomous vehicle.

8. The method of claim 6, wherein at least one of the current location of the autonomous vehicle and the different location is a landing area, a launch area, a repair area, an inspection area, or a charging station.

9. The method of claim 6, wherein the home base is at least one of a storage facility, an inspection facility, a maintenance facility, or a repair facility.

10. The method of claim 6, wherein the first capability state of the autonomous vehicle comprises one or more of low speed remote controlled motion within the home base or limited distance remote controlled motion within the home base.

11. The method of claim 6, wherein the first signal further causes the vehicle computing system to disable or limit a function of one or more components of the autonomous vehicle.

12. The method of claim 6, wherein the second signal further causes the vehicle computing system to activate autonomous operating capabilities of the autonomous vehicle.

13. The method of claim 6, wherein the second signal indicates a remediation of the first vehicle condition.

14. One or more non-transitory computer-readable media storing instructions that, when executed by one or more processors, perform operations comprising:

transmitting, to a vehicle computing system of an autonomous vehicle, a first request for first condition data for a first component of the autonomous vehicle;

receiving, from the vehicle computing system, the first condition data;

determining, based on the first condition data, a first vehicle condition;

transmitting, to the vehicle computing system, based at least in part on the first vehicle condition and a current location of the autonomous vehicle, a first signal that causes the vehicle computing system to move the autonomous vehicle to a different location from the current location and configure a second component of the autonomous vehicle in accordance with a first capability state of the autonomous vehicle, wherein the current location of the autonomous vehicle and the different location are located within a home base of a fleet of autonomous vehicles;

transmitting a second request for second condition data for a third component of the autonomous vehicle;

receiving the second condition data;

determining, based on the second condition data, a second vehicle condition; and transmitting, to the vehicle computing system, based at least in part on the second vehicle condition and the different location, a second signal that causes the vehicle computing system to reconfigure the second component in accordance with a second capability state of the autonomous vehicle.

15. The one or more non-transitory computer-readable media of claim 14, wherein one or more of the first condition data and the second condition data are based at least in part on one or more self-checks executed by the autonomous vehicle.

16. The one or more non-transitory computer-readable media of claim 14, wherein at least one of the current location of the autonomous vehicle and the different location is a landing area, a launch area, a repair area, an inspection area, or a charging station.

17. The one or more non-transitory computer-readable media of claim 14, wherein the home base is at least one of a storage facility, an inspection facility, a maintenance facility, or a repair facility.

18. The one or more non-transitory computer-readable media of claim 14, wherein the first signal further causes the vehicle computing system to limit one or more of a speed capability of the autonomous vehicle or a travel distance capability of the autonomous vehicle.

19. The one or more non-transitory computer-readable media of claim 14, wherein the first signal further causes the vehicle computing system to activate one or more of a light emitter associated with the autonomous vehicle or a sound emitter associated with the autonomous vehicle, wherein activating the light emitter associated with the autonomous vehicle comprises emitting one or more of colored light, flashing light, or steady light.

20. The one or more non-transitory computer-readable media of claim 14, wherein the second signal indicates a remediation of the first vehicle condition and further causes the vehicle computing system to activate autonomous operating capabilities of the autonomous vehicle.

* * * * *